Aug. 20, 1946.   C. G. VOKES ET AL   2,406,308
FILTER
Filed Sept. 1, 1943   3 Sheets-Sheet 1

Inventors
Cecil G. Vokes
Edward A. Stokes
By
Attorney

Cecil G. Vokes
Edward A. Stokes
Inventor
By
Attorney

Aug. 20, 1946.    C. G. VOKES ET AL    2,406,308
FILTER
Filed Sept. 1, 1943    3 Sheets-Sheet 3

INVENTORS
CECIL G. VOKES
EDWARD A. STOKES
BY
ATTORNEY

Patented Aug. 20, 1946

2,406,308

UNITED STATES PATENT OFFICE 2,406,308

FILTER

Cecil Gordon Vokes and Edward Arthur Stokes, London, England; said Stokes assignor to Vokes Limited, London, England Application September 1, 1943, Serial No. 500,873
In Great Britain September 17, 1942

7 Claims. (Cl. 210—164)

In the specification of pending application No. 344,583 (C. G. Vokes) there is described a filter in which filtration is maintained in a parallel circuit which returns finely filtered oil to a reservoir or the like, even when back pressure on less fine main flow filtering means has caused the latter to be automatically by-passed. The present invention provides a simple and compact construction suitable for functioning in such a manner. In its preferred forms the finer and less fine filtering means take the form of filter units mounted substantially co-axially in a common casing, the finer filtering means and its outlet being preferably merely added in an extra length or (possibly) diameter, or both of the enclosing shell of what is substantially or exactly one of the present standard types of Vokes' oil filters embodying a unit like that of the main circuit filter shown in the above mentioned specification. In this invention the main flow can by-pass the less fine filtering unit completely when clogging has raised its back pressure to a predetermined value, while the finer unit is intended to remain normally fixed in the parallel circuit (though a safety valve may be used to prevent excessive difference of pressure when oil or the like is cold and until its warms up) and appropriate cleaning enables it to continue to perform a useful function almost indefinitely.

Other parts of the invention are embodied in typical forms shown upon the accompanying drawings, the parts for which a monopoly is desired being those delimited by the claims.

Figure 1:
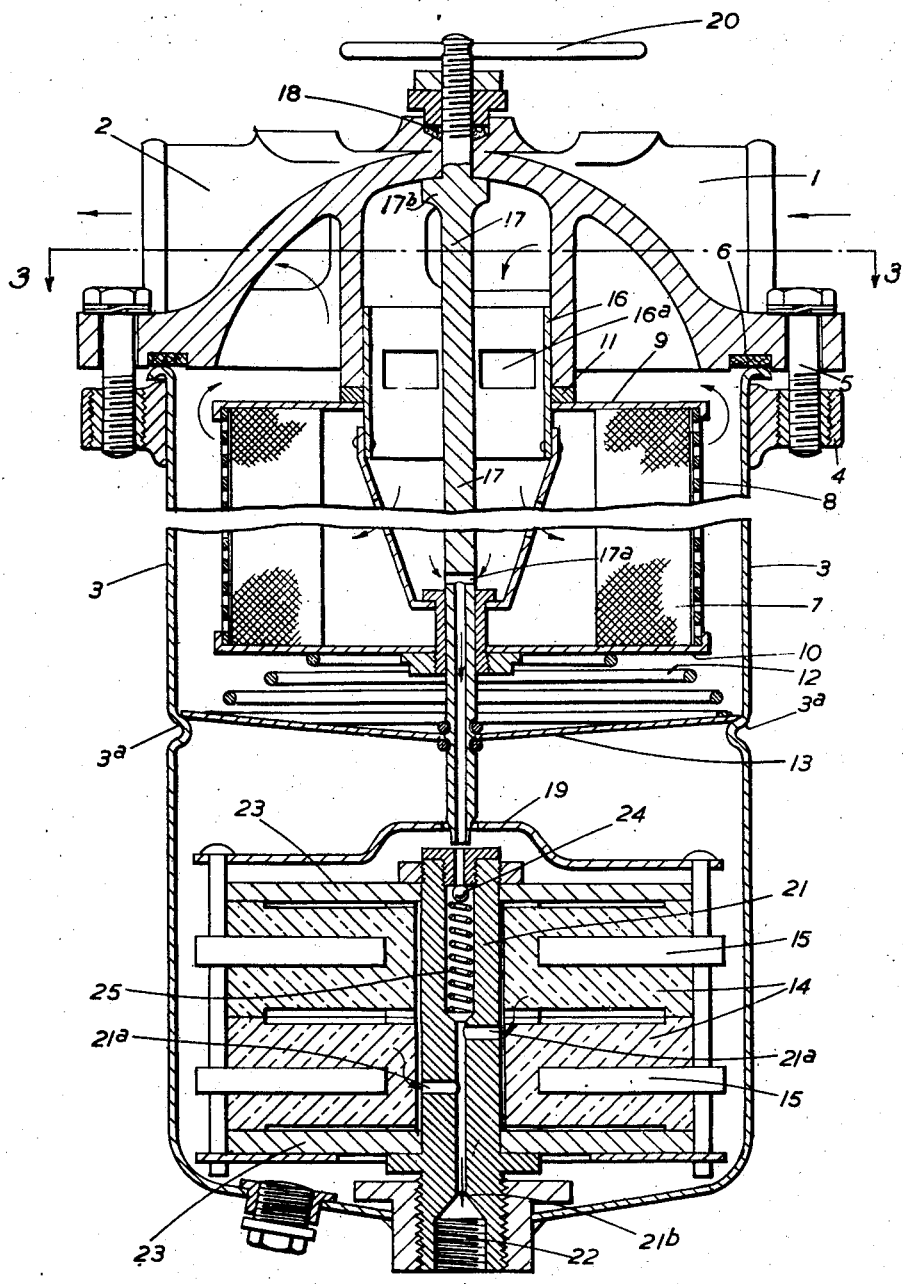
Fig. 1 is a sectional elevation of one such form.

In each form a header is formed by a casting with an inlet connection 1 and a main flow outlet connection 2 and a main enclosure completed by a shell or casing 3 secured, by a clamping ring 4 and bolts 5, against joining material 6.

The less fine filtering unit is of the well-known form in which an appropriate deeply pleated or star-shaped screen 7 in a cylinder 8 of perforated metal is held between end plates 9, 10 and carries a joint or joints 11 resiliently pressed against the header by a spring 12. The spring 12 bears against a diaphragm 13 which rests on a swaged internal bead 3a in the shell 3 and forms a partition which need not necessarily be completely fluid-tight (though it will preferably stop large particles of dirt or other impurity) because a certain amount of additional flow in the lower chamber caused by some leakage at this point will help to maintain an even favourable temperature of the oil in the filter. The filter filtering unit is of a form which is the subject of a co-pending application, filed September 1, 1943, Serial No. 500,872, being built up of deeply grooved discs 14 of finely porous ceramic material so as to provide a hollow cylinder with deep hollow peripheral fins giving a substantial area exposed to the fluid to be filtered and cleanable by the scraping action of spring knives 15 when relatively rotated.

Turning now specifically to the form of Fig. 1, the less fine unit has at its inlet a guiding tube 16 with ports 16a. The tube 16, open at the ends is slidably guided in an appropriately formed part of the header casting, and the ports 16a therein are closed by the wall of the casting when the less fine filtering unit is in normal operative position, that is, when the filtering unit is raised as indicated in Fig. 1. The tube 16 is movable with the less fine filtering element being preferably welded or otherwise secured to the plate 9. Obviously, when under conditions to be defined the less fine filtering element is lowered, the openings 16a are, in the movement of the tube 16 in position to establish communication in the interior of the tube 16 and the space between the less fine filtering element and the outlet 2 of the header. When the back pressure of the screen 7 is sufficient to cause the unit to move against the pressure of spring 12 the fluid from the header inlet 1 passes through the ports 16a directly to the main flow outlet 2, by-passing the screen 7. The fluid passing to the parallel circuit through the finer unit enters a central rod 17 by ports 17a which are at least a sufficient distance above the bottom of the less fine unit to avoid picking up accumulated dirt or sludge. The rod 17 passes through the header and is removably fixed relative thereto against longitudinal movement by shoulder 17b bearing against the header from beneath and removable securing means above the header. The rod 17 extends longitudinally through the tube 16 and the less fine filtering means, said rod being formed, within the less fine filtering means with the ports 17a communicating with the upper end of a longitudinal bore of the rod 17 which opens through its lower end. The rod 17 carries the diaphragm 13 in a groove or by means of spring ring clips or the like and has a substantial shoulder 17b and a gland at 18 where it passes through the header. It delivers the fluid to the space beneath the diaphragm and has a screwdriver or squared or other suitable lower end to engage a complementary part of a spider 19 forming part of the structure that carries the spring knives 15. Rotation of the rod 17 by means of a tommy-bar 20 or other operating member outside the filter enclosure thus periodically cleans and scrapes away a small surface layer of the material of the grooved discs 14. Fluid passing through the finely porous material of the discs enters the hollow clamping bolt 21 by ports 21a and emerges at the outlet 22. The clamping bolt is used to mount the finer filtering unit and holds the discs 14 assembled between plates 23. When oil is cold a very considerable back pressure is exerted by the material of the discs 14 even though the surface is kept clean by the knives and may crush or damage them. A safety valve consisting of ball 24 and spring 25 may therefore be fitted to limit the difference between external and internal pressure. A restriction at 21b in the lower part of the bore of the hollow bolt 21 causes the internal pressure to build up and prevents mere by-passing when such conditions obtain. The restriction 21b is not designed to prevent passage therethrough, but is particularly formed to prevent more than a limited flow. Thus, if the normal oil pressure when the oil is hot should be, for example, 10 lbs. per sq. in., such pressure may approximate 50 lbs per sq. in. when the oil is cold. The restriction 21b is formed to allow the internal pressure to build up to, in the example quoted, 40 lbs. per sq. in., so that the walls of the discs 14 are subjected only to a difference of pressure, outside and inside, of approximately 10 lbs. per sq. in. When the oil is hot and the viscosity low, the ball 24 will be seated and the effect of the restriction to flow of 21b will be so small as to be negligible.

In operation the fluid enters the apparatus at the inlet 1 and if the oil is cold it may for a short time by-pass the less fine filtering unit. While ordinarily the oil is not at a temperature to compel this by-pass, it will under these conditions, move the ball 24 so that the flow of oil into the finer unit, through the walls of that unit through its exterior walls is relatively small and there will be some delivery or bypassing through the restriction 21b. As the oil warms up, ball 24 returns to its seat, and the packing ring 11 of the coarser unit moves to its seating position, assuming that the coarser unit has been depressed at all in the initial flow of the cold oil. The parts are then in the position shown in Fig. 1 and function normally for filtering purposes. When the filter screen 7 is choked or clogged to the predetermined extent the coarser unit moves down against the tension of spring 12. This does not reduce the oil pressure on the finer unit, except by the amount of the predetermined back pressure, say 10% of the total, since the finer unit is in circuit to the bearings or other point of lubrication application. The finer unit continues to function and passes substantially its full quota as long as it is kept substantially clean by the scraping operation described. The inlet pressure will not suffice to lift the ball 24 so long as the oil is hot. It will, of course, be obvious that the flow of oil through the coarser and finer units is in parallel circuit, because the oil entering the heater is directed through the two units in parallelism. That is, a main flow circuit through the coarser unit and a parallel flow circuit through ports 17a. The oil through the coarser filter reaches outlet 2 while the oil through the finer filter reaches outlet 22.

Figure 2:
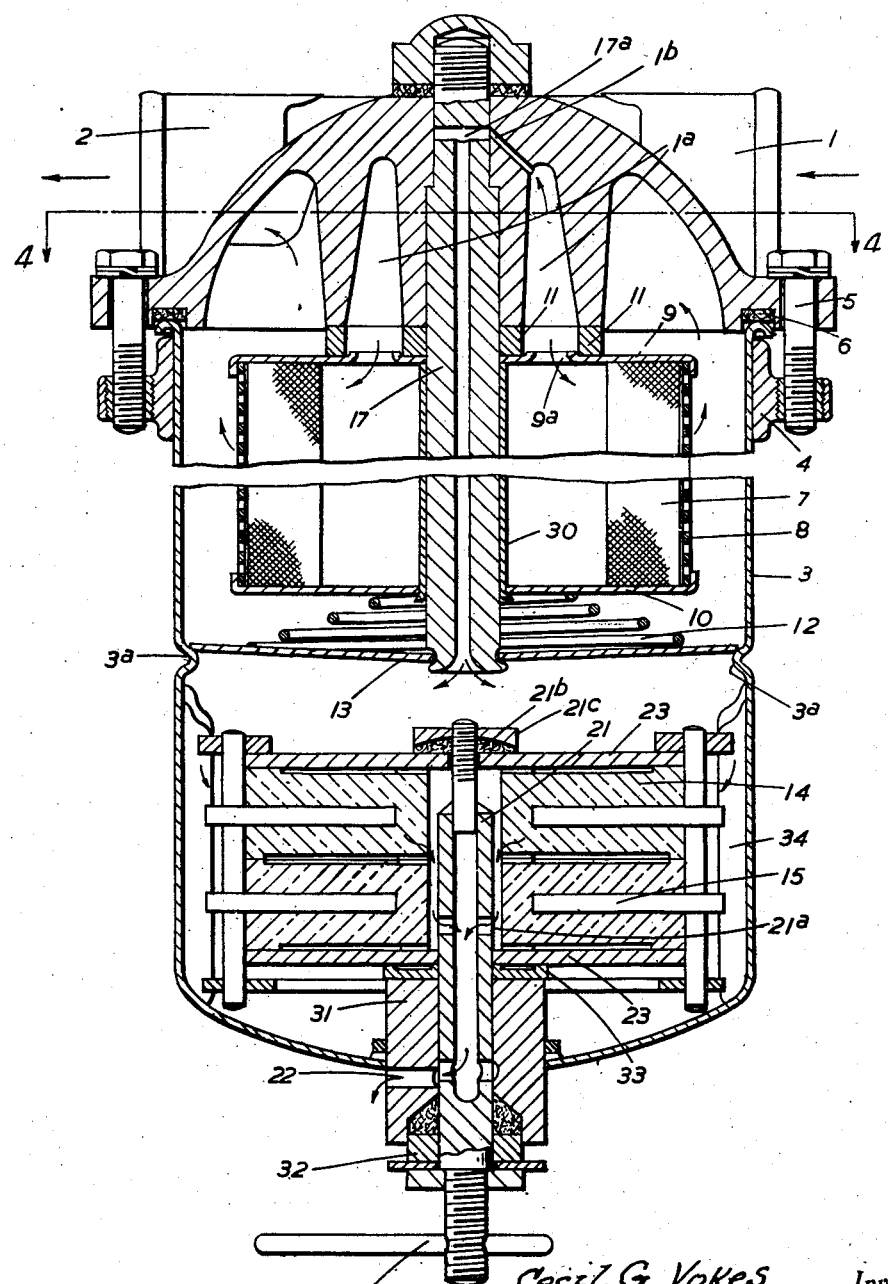
Fig. 2 is a similar view of another such form.
Figure 3:
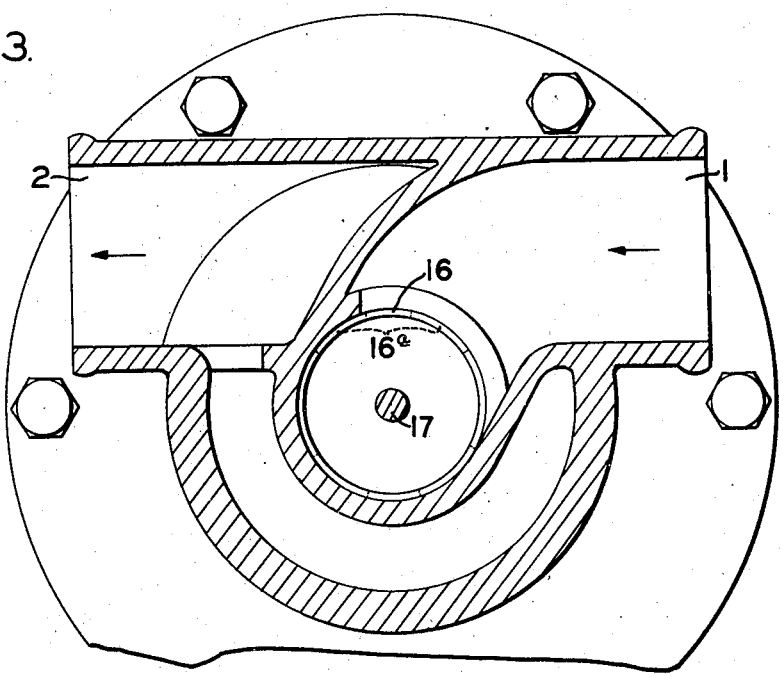
Fig. 3 is a section on line 3—3 of Fig. 1.
Figure 4:
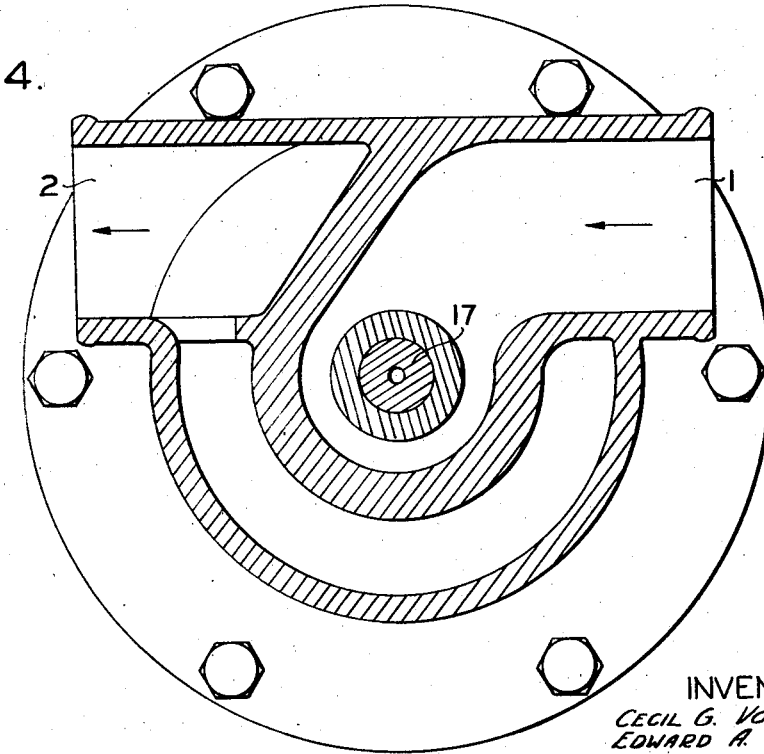
Fig. 4 is a section on line 4—4 of Fig. 2.

Turning next to the specific form of Fig. 2, the inlet to the less fine unit is through ports 9a from a substantially annular space 1a in the header. A central tube 30 connects the end plates 9 and 10 and by-passing takes place directly from the space 1a to the main flow outlet 2 when clogging of the screen 7 represents the predetermined back pressure. The unit is movable on the fixed hollow central rod 17 which carries the diaphragm 13 and feeds the space below the diaphragm with fluid from the inlet 1 by passages 1b.

The finer unit is of similar construction to that shown in Fig. 1, but is rotatable by rotating the hollow clamping bolt 21 with packing at 21b under its nut or head 21c by tommy bar 20 or the like. A fixed plug 31 in the bottom of the casing affords a gland at 32 and a bottom outlet at 22 for the finely filtered fluid: it supports the washer 33 on which the filter unit rotates. The knife-carrying structure is prevented from rotating by lugs 34 secured in the casing 3. The tube 16 of Fig. 1 and the joint members 11 of Figs. 1 and 2 obviously serve as valves for providing direct flow from the inlet to the outlet of the header when the less-fine filter is inoperative. While the term "coarse" and "fine" has been applied to the filtering elements in the claims, it will be understood that the terms are used simply to distinguish the two and are relative only.

We claim:

1. In a filter, a generally cylindrical casing having a central axis and a closed lower end, a header closing the upper end of said casing, said header having internal wall means defining a chamber, there being an inlet in said header in communication with said chamber, there also being an outlet in said header exteriorly of said chamber, a partition in said casing forming first and second compartments spaced along said axis, a coarse filtering element in said first compartment and having a first closed end having an opening therein, a second and imperforate end remote from said wall and perforate side walls, resilient means between said second end and partition yieldingly urging said first end of said coarse filtering element into fluid-tight engagement with the end of said chamber wall means, whereby fluid passes from said inlet to said chamber, thence through the opening in the first end of said coarse filtering element to the interior of the same and through said perforate side wall to said outlet, a fine filtering element in said second compartment having an internal passage, a second outlet in the lower end of said casing, and means including a tube extending axially through the second end of said coarse filtering element and partition and forming a passageway to said second compartment and the exterior of said fine filtering element, the interior passage of said fine filtering element having means providing communication with said second outlet.

2. In a filter, a generally cylindrical casing having a central axis and closed ends, a header closing the upper end of said casing, said header having an internal wall means coaxial of said axis and defining a chamber, there being an inlet in said header in communication with said chamber, there also being an outlet in said header from the exterior of said chamber, a partition in said casing forming upper and lower compartments spaced along said axis, a coarse filtering element in said upper compartment, said element having spaced imperforate closed ends and filtering material extending between and peripherally of said ends to define an internal space, one of said ends having an opening therein in communication with said inlet, resilient means yieldingly urging said coarse filtering element so that its upper end is in fluid-tight engagement with the lower end of said internal wall means, whereby fluid normally passes from said inlet, to said chamber through said opening, thence to said space interiorly of said filter and through the same to said outlet in the lower compartment, a fine filtering element in said lower compartment having an internal passage in communication with said second outlet and a tube having one end in the lower compartment and extending centrally through the ends of said coarse filtering element and said partition into the header, means providing a passageway from the chamber communicating with the other end of said tube, said coarse filtering element movable axially on and along said tube in response to a predetermined pressure in said chamber, to place said inlet and first outlet in direct communication about the end of said wall means.

3. A filter comprising a generally cylindrical casing having a central axis, one end of said casing having an internal wall means extending about said axis to form a chamber, there being an inlet in said end leading to said chamber and an outlet from said end exteriorly of said chamber, a partition dividing said casing into first and second compartments, spaced along said axis, a coarse filter in said first compartment, said filter having spaced imperforate end walls and filtering material extending peripherally thereof to define a space internally thereof, spring means between said partition and the adjacent end wall of said coarse filter, urging the other wall of said filter into fluid-tight engagement with the end of said chamber wall means, there being an opening in said adjacent end to the interior of said coarse filter, said filter being axially translatable against the action of said spring means, by and in response to a predetermined fluid pressure in said chamber to form a direct passage between said inlet and outlet about the end of said internal wall means, a second outlet in the other end of said casing, a fine filtering element in said second chamber having means internally thereof in communication with said second outlet, and means forming a passageway axially of said casing through the lower wall of said coarse filtering element and said partition to said second compartment, said fine filtering element including a normally closed valve in said internal means adapted to open in response to a predetermined pressure in said second compartment to by-pass fluid directly from said second compartment to said second outlet.

4. In a filter, a generally cylindrical casing having a central axis and a closed lower end, a header closing the upper end of said casing, said header having internal wall means defining a chamber, there being an inlet in said header in communication with said chamber, there also being an outlet in said header exteriorly of said chamber, a partition in said casing forming first and second compartments spaced along said axis, a coarse filtering element in said first compartment and having a first end having an opening axially thereof, a second and imperforate end remote from said wall, and perforate side walls, resilient means between said second end and partition yieldingly urging said first end of said coarse filtering element into fluid-tight engagement with the end of said chamber wall means, whereby fluid passes from said inlet to said chamber, thence through the opening in the first end of said coarse filtering element to the interior of the same and through said perforate side walls to said outlet, a fine filtering element in said second compartment, a second outlet in the lower end of said casing, and means including an open-ended tube extending axially through the second end of said coarse filtering element and partition to said second compartment, said fine filtering element having means providing communication with said second outlet.

5. In a filter, a generally cylindrical casing having a central axis and a closed lower end, a header closing the upper end of said casing, said header having internal wall means defining a chamber, there being an inlet in said header in communication with said chamber, there also being an outlet in said header exteriorly of said chamber, a partition in said casing forming first and second compartments spaced along said axis, a coarse filtering element in said first compartment and having a first closed end having an opening therein, a second and imperforate end remote from said wall and perforate side walls, resilient means between said second end and partition yieldingly urging said first end of said coarse filtering element into fluid-tight engagement with the end of said chamber wall means, whereby fluid passes from said inlet to said chamber, thence through the opening in the first end of said coarse filtering element to the interior of the same and through said perforate side wall to said outlet, a fine filtering element in said second compartment having an internal passage a second outlet in the lower end of said casing, and means forming a passageway from the interior of said coarse filtering element to said lower compartment, whereby a portion of the fluid entering said coarse filtering element passes to said lower compartment, thence through said fine filtering element to said second outlet.

6. A filter as claimed in claim 1, said fine filtering element comprising a cylindrical filtering body, means mounting said body with its axis coincident with said central axis, there being a plurality of circumferential axially-spaced grooves in said body, a plurality of scrapers each fitting a respective groove in said filtering body, and means including said tube operable from the exterior of said casing, for rotating said scrapers as a unit to cause them to traverse said grooves and clean the same.

7. A filter as claimed in claim 2, said fine filtering element comprising a generally cylindrical filter body, coaxial of said casing and having axially-spaced, circumferential grooves, a plurality of scrapers fixedly mounted in said lower compartment, each engaging within a respective groove, and means operable from the exterior of said casing to rotate said filter body to cause said scraper to traverse its groove and clean the same.

CECIL GORDON VOKES.
EDWARD ARTHUR STOKES.